(12) United States Patent
Makino

(10) Patent No.: US 8,829,757 B2
(45) Date of Patent: Sep. 9, 2014

(54) DC MOTOR INCLUDING A GROUP OF COILS PROVIDED BY A SINGLE CONDUCTOR WIRE

(75) Inventor: Yusuke Makino, Kyoto (JP)

(73) Assignee: Nidec Corporation, Kyoto (JP)

( * ) Notice: Subject to any disclaimer, the term of this patent is extended or adjusted under 35 U.S.C. 154(b) by 172 days.

(21) Appl. No.: 13/259,368

(22) PCT Filed: May 27, 2010

(86) PCT No.: PCT/JP2010/058983
§ 371 (c)(1),
(2), (4) Date: Sep. 29, 2011

(87) PCT Pub. No.: WO2010/137642
PCT Pub. Date: Dec. 2, 2010

(65) Prior Publication Data
US 2012/0086297 A1 Apr. 12, 2012

(30) Foreign Application Priority Data
May 28, 2009 (JP) .................. 2009-129079

(51) Int. Cl.
*H02K 3/04* (2006.01)
*H01R 39/32* (2006.01)
*H02K 23/30* (2006.01)
*H02K 23/38* (2006.01)

(52) U.S. Cl.
CPC ............ *H02K 23/30* (2013.01); *H02K 2213/09* (2013.01); *H02K 23/38* (2013.01); *H02K 2213/03* (2013.01)
USPC ............ 310/203; 310/195; 310/204; 310/234

(58) Field of Classification Search
USPC ......... 310/223, 224, 233, 234, 203, 195, 179, 310/180, 184, 198, 219–255
IPC  H02K 23/24,23/30, 23/38, 23/26; H01R 39/04, H01R 39/32
See application file for complete search history.

(56) References Cited

U.S. PATENT DOCUMENTS 3,733,506 A * 5/1973 Jaffe et al. ...................... 310/198
6,667,565 B2 * 12/2003 Strobl ............................ 310/237

(Continued)

FOREIGN PATENT DOCUMENTS

| JP | 2006-353019 A | 12/2006 |
| JP | 2007-143278 A | 6/2007 |
| JP | 2007-267439 A | 10/2007 |
| JP | 2008-136343 A | 6/2008 |
| JP | 2008-306912 A | 12/2008 |
| JP | 2009-060783 A | 3/2009 |

OTHER PUBLICATIONS

Machine Translation, JP 2008306912 A, Dec. 18, 2008.*
Official Communication issued in International Patent Application No. PCT/JP2010/058983, mailed on Jul. 20, 2010.

*Primary Examiner* — Tran Nguyen
*Assistant Examiner* — Thomas Truong
(74) *Attorney, Agent, or Firm* — Keating & Bennett, LLP

(57) ABSTRACT

A multipolar motor is simply wire-wound and an output thereof is capable of being switched. The motor includes at least 8 magnetic poles, an armature including at least 10 tooth sections; a commutator including at least 20 commutator segments, and brush-sets including 2 positive electrode brushes and 2 negative electrode brushes. A hook-holding section arranged to hook-hold conductor wires is installed on each of the commutator segments. Further, a group of coils is defined by using a single conductor wire that is wound onto each of the plurality of tooth sections and hooked onto the plurality of hook holding sections. This motor can switch the state in which the brush-set is energized.

7 Claims, 22 Drawing Sheets

(56) References Cited

U.S. PATENT DOCUMENTS

| | | |
|---|---|---|
| 7,821,170 B2 | 10/2010 | Qin et al. |
| 7,982,354 B2 | 7/2011 | Qin et al. |
| 2006/0220489 A1* | 10/2006 | Osawa et al. ............... 310/198 |
| 2007/0188040 A1* | 8/2007 | Kawashima et al. ......... 310/225 |
| 2009/0058210 A1* | 3/2009 | Qin et al. ..................... 310/179 |
| 2009/0315426 A1 | 12/2009 | Kawashima et al. |
| 2011/0023798 A1 | 2/2011 | Qin et al. |

\* cited by examiner

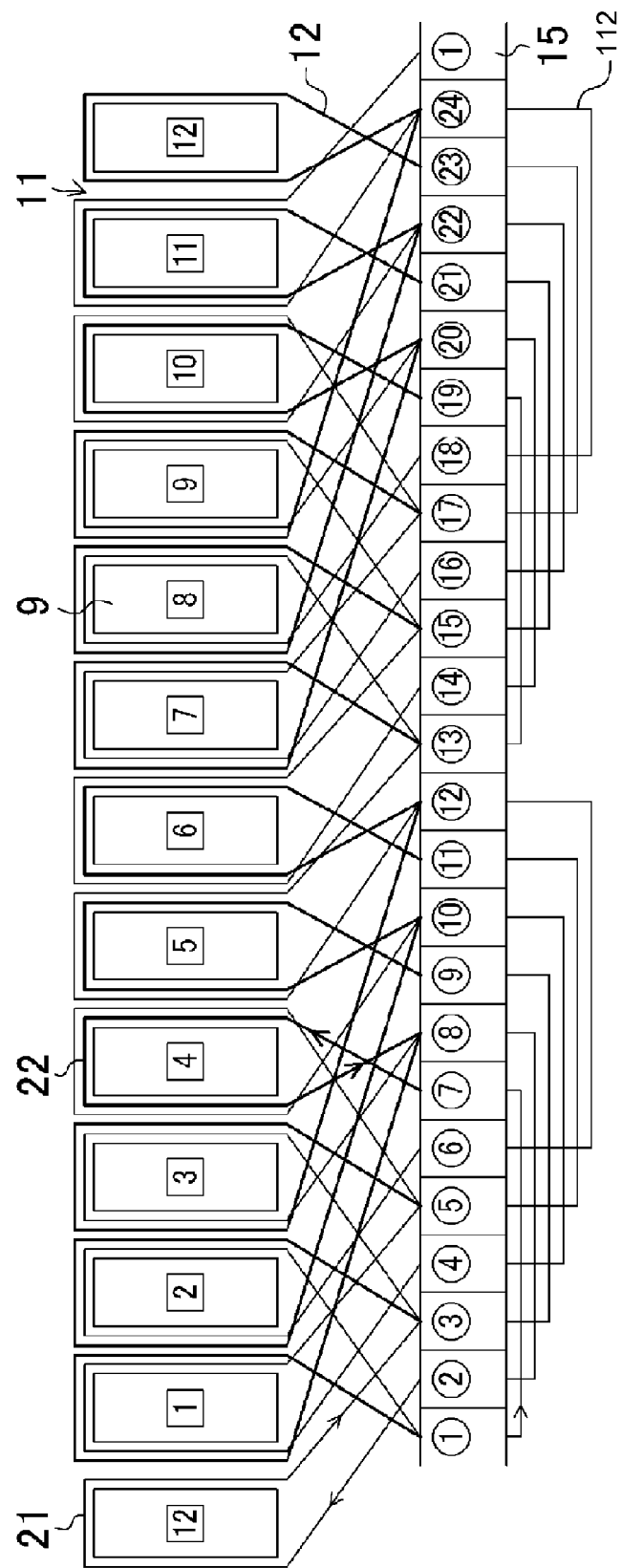

DC MOTOR INCLUDING A GROUP OF COILS PROVIDED BY A SINGLE CONDUCTOR WIRE

BACKGROUND OF THE INVENTION

1. Field of the Invention

The present invention relates to a motor and more specifically to a motor wherein the output thereof can be switched.

2. Description of the Related Art

An 8-pole, 10-slot and 20-segment DC motor with a wire winding devised for the down-sizing of the motor is known in the art (Japanese Patent Application Publication No. 2008-136343), although the output thereof cannot be switched. Specifically, magnetic poles are formed by 8 permanent magnets, and five-phase-coil structure are formed by allocating U, V, W, X, and Y phase respectively to the 10 slots of an armature. The 20 segments of a commutator are wound using connecting wires by an interval of 4 segments and are short-circuited.

A 4-pole, lap-winding motor where the rotational velocity can be switched is also known (Japanese Patent Application Publication No. 2006-353019). This motor is a multipolar motor having at least 4 poles and a winding structure by lap-winding, which includes a plurality of brushes arranged in equal intervals in the circumferential direction, and provides an operation mode of at least 2 speed types by selectively energizing the brushes. The plurality of brushes includes a positive electrode first brush and a positive electrode second brush disposed to oppose the positive electrode first brush, and a negative electrode first brush and a negative electrode second brush disposed to oppose the negative electrode first brush. This motor has a low speed mode where the positive electrode first brush and the negative electrode first brush are energized, and a high speed mode where all 4 brushes are energized.

Also, a multipolar motor having at least 4 poles and a lap-winding winding structure is known. This motor includes a first brush and a second brush used for a low speed operation, a third brush used with either the first or the second brush for a high speed operation, and an equalizer for connecting coils that need to have the same isoelectric potential among a plurality of coils. In this motor, brushes having the same electric potential can be removed, which thereby makes it possible to reduce the total number of brushes required.

Another known multipolar motor has a brush arranged in either a place moved by an advance-angle or by a delay-angle from the place opposing a first brush, a second brush, and a third brush in the rotating direction of a motor. According to this motor, a new operation mode can be realized without drastically increasing the number of brushes even in a multipolar device. For example, in this motor, when an equalizer is applied to a 6-pole device, a low speed mode can be operated with 2 brushes, although 6 brushes are normally required. At this point, 4 spaces become empty where the brushes are arranged normally, and these spaces can be used for arranging brushes for separate operation modes, which makes it possible to add 4 other kinds of operation modes other than the low speed mode and the high speed mode. That is, the more poles the motor has, the more it becomes possible to increase types of operation modes.

In general, when output switching is controlled by a multipolar motor having 8 or more poles, the configuration of a motor becomes complicated because the total number of brushes correspondingly increases. Accordingly, it is possible to reduce the number of brushes when coils having the same electric potential are connected with an equalizer as in the motor disclosed by Japanese Patent Application Publication No. 2006-353019. However, when an equalizer is connected, the number of required wire winding processes correspondingly increases, which deteriorates productivity.

SUMMARY OF THE INVENTION

Preferred embodiments of the present invention provide a motor having 8 or more poles where the output thereof is switched with excellent productivity.

A motor according to a preferred embodiment of the present invention is preferably provided with at least 8 magnetic poles, an armature including at least 10 tooth sections, a commutator including at least 20 commutator segments, and a brush-set including 2 positive electrode brushes and 2 negative electrode brushes. There is preferably a hook-holding section arranged to hook-hold a conductor wire, installed on each of the segments. A group of coils is preferably defined using a single conductor wire, by winding the conductor wire onto each of the multiple tooth sections, and hooking the conductor wire onto the multiple hook-holding sections along the way. This motor is configured so that the state in which the brush-sets are energized can be switched. According to this configuration, there is no need for an equalizer to be connected, since a group of coils is formed by winding a single conductor wire.

The motor according to a preferred embodiment of the present invention provides a motor where the output thereof is switched with excellent productivity.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 13A and FIG. 13B are diagrams illustrating the winding order of a conductor wire according to the second preferred embodiment of the present invention.

DETAILED DESCRIPTION OF THE PREFERRED EMBODIMENTS

Set forth below are detailed descriptions of preferred embodiments for the present invention based on the figures. The descriptions below are substantially examples, and they do not necessarily imply any limitations on the present invention, where it is applied to or how it is used.

First Preferred Embodiment

Figure 1:
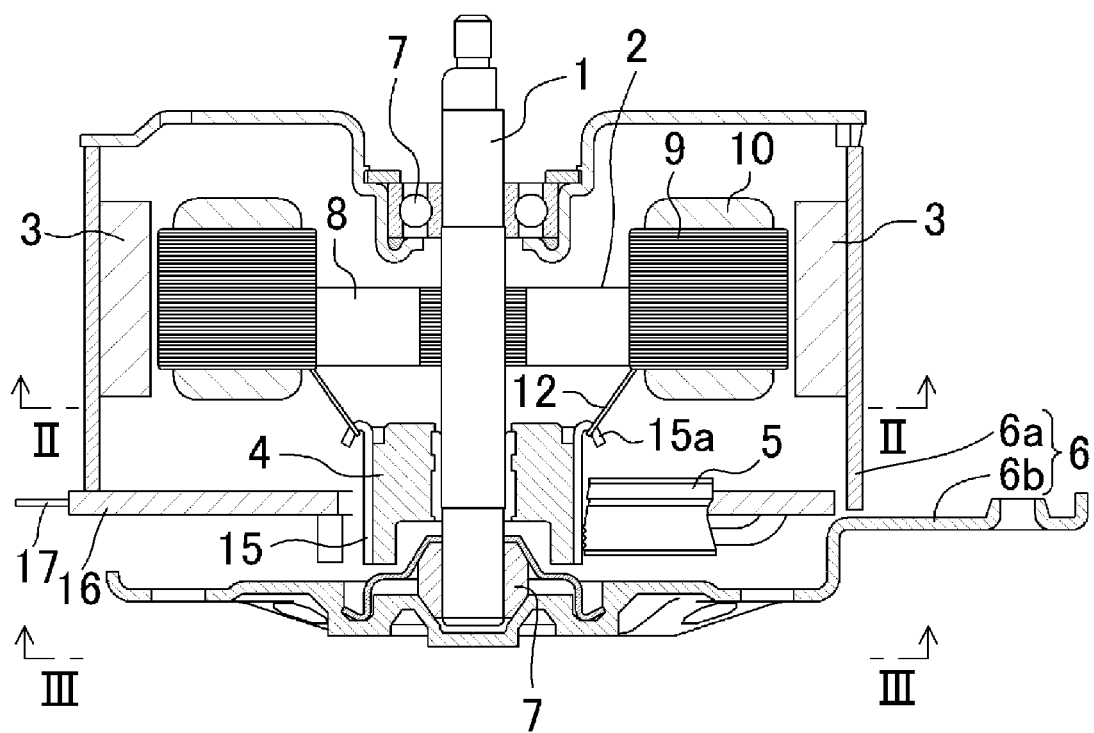
FIG. 1 is a schematic sectional diagram illustrating the motor according to the first preferred embodiment of the present invention.
Figure 2:
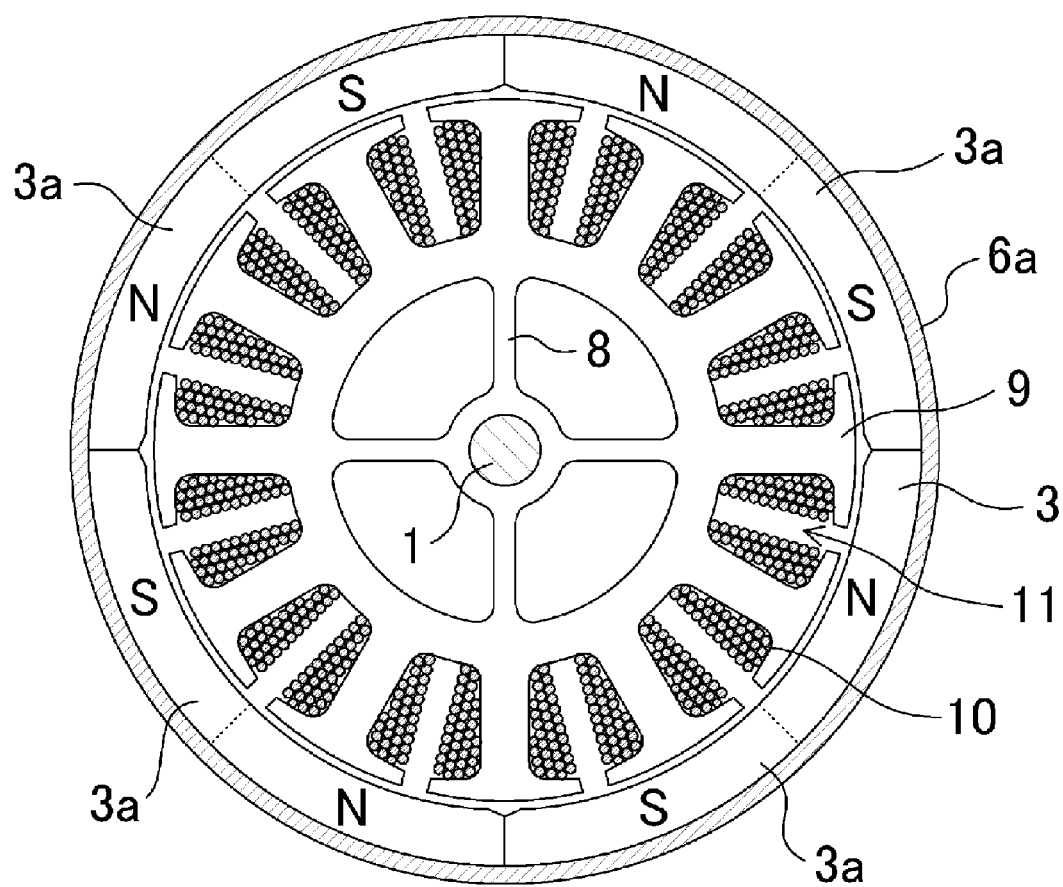
FIG. 2 is a sectional view of the II-II line of FIG. 1.
Figure 3:
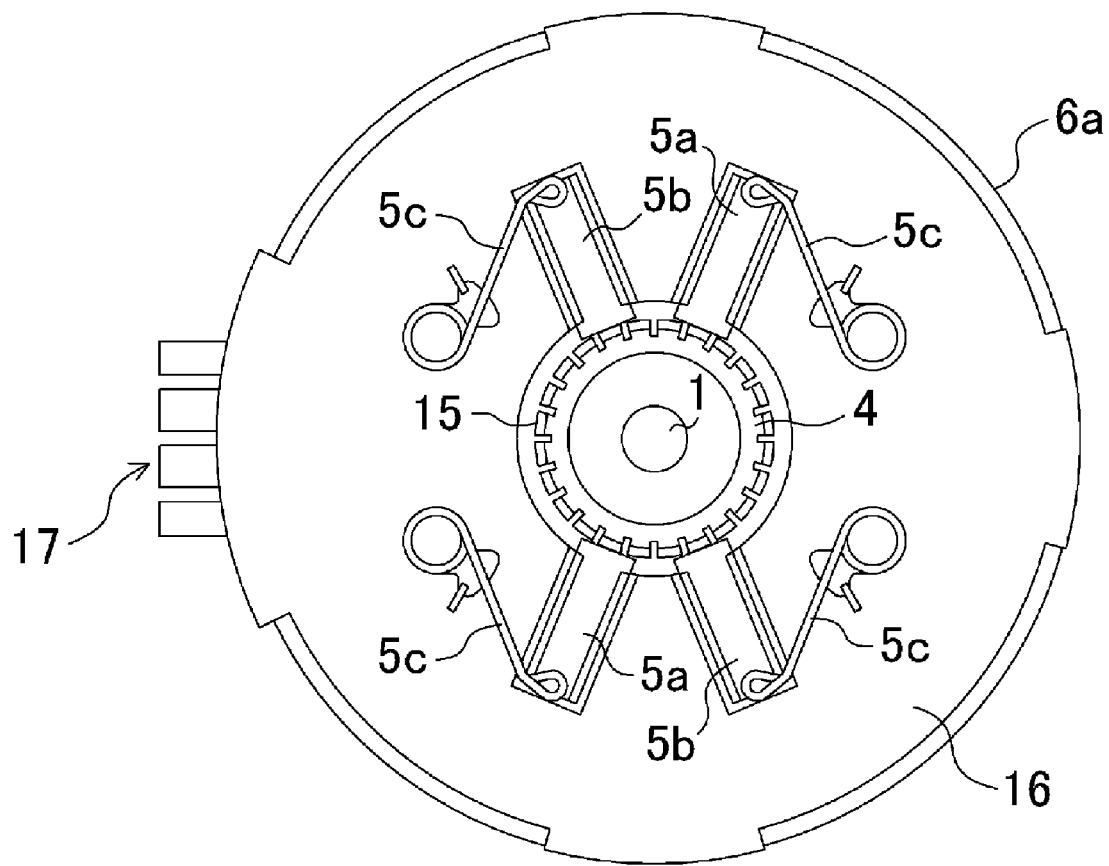
FIG. 3 is a diagram viewed from the III-III line direction, without the back cover of FIG. 1.

FIGS. 1-3 illustrate the motor according to the present preferred embodiment of the present invention. This motor is a DC motor preferably including a rotation shaft (1), an armature (2), a magnet (3), a commutator (4), and a brush-set (5) accommodated in a housing (6).

The housing (6) preferably includes a case (6a) which preferably has an approximately flat cylindrical shape including an opening at one edge, and a back cover (6b) covering the opening. The shaft (1) is supported rotatably by bearings (7, 7) in the case (6a) and the back cover (6b). The armature (2) or the commutator (4) is fixed on the shaft (1). Although it is not illustrated in the drawings, a knurling process is preferably performed on the outer circumferential surface of the shaft (1) in order to restrict movement of the armature (2) or the commutator (4) in the circumferential direction. The armature (2) preferably includes a disk-shaped core (8) fixed to the middle portion of the shaft (1) in the axial direction, a plurality of tooth sections (9, 9, ...) having a T-shaped cross section arranged to extend radially on the outer periphery of the core (8) in equal intervals, and a group of coils (10, 10, ...) wound around the tooth sections (9, 9, ...). The core (8) and the tooth section (9) are preferably formed by laminating metal plates in the axial direction, but any other type of stator core could also be used if so desired. In the present preferred embodiment, 10 tooth sections (9) are provided, and slots (11, 11, ...) (preferably 10 slots) are respectively provided between the adjacent tooth sections (9).

A conductor wire (12) is wound around the tooth section (9) so that it passes through each slot (11, 11, ...). 10 coil groups are provided on the outer periphery of the core (8) (concentrated winding). The magnet (3) preferably includes 4 magnet units (3a, 3a, 3a, 3a) having approximately a circular arc shape which are arranged by bisecting them into N-poles and S-poles. The magnet (3) is fixed on the inner circumferential surface of the housing (6) in a substantially annular ring shape by arranging the unit magnets (3a, 3a, 3a, 3a) to closely face the outer circumferential surface of the armature (2). In the present preferred embodiment, 8 different magnetic poles (8 poles) are preferably arranged alternatively in equal intervals around the circumference of the axis. The main wall of the housing (6) where the magnet (3) is fixed also serve as a back yoke. Using 4 polarized unit magnets (3a) to define the magnet (3) makes the installation easier when compared to using 8 magnets.

The commutator (4) includes a circular cylinder-shaped member, fixed at the end portion of the shaft (1). On the outer circumferential surface of the commutator (4), a plurality of commutator segments (15, 15, ...) with excellent electrical conductivity and preferably having a shape of an approximate band plate are consecutively fixed in the circumferential direction in equal intervals. In order to avoid electrical conduction between adjacent commutator segments (15), each commutator segment (15) is arranged with a spacing therebetween. In the present preferred embodiment, the number of commutator segments (15) provided is preferably 20 (20 segments). A hook-holding section (15a) to hook-hold the conductor wire (12) is integrally provided with each segment (15) on the end portion of the segment (15) at the side of the armature (2). A wire winding structure is defined by hook-holding a single conductor wire (12) onto the hook-holding section (15a), and winding the wire onto each tooth section (9).

A brush-set (5) is preferably installed on a brush plate (16) which is fixed inside the housing (6). The brush plate (16) is preferably defined by a member having an approximately flat disc shape where a circular hole having a larger diameter than the diameter of the commutator (4) is provided in the center. The brush-set (5) preferably includes 2 positive electrode brushes (5a, 5a) and 2 negative electrode brushes (5b, 5b), and is provided on the periphery of the commutator (4), for example. Each brush (5a, 5a, 5b, 5b) is arranged along the radial direction of the brush plate (16), and is supported so that it can move radially back and forth toward the circular hole. The end portion on each brush (5a, 5a, 5b, 5b) at the side of the circular hole is pressed onto the outer circumferential surface of the commutator (4) by a spring (5c), and each brush (5a, 5a, 5b, 5b) is electrically connectable with each commutator segment (15) by sliding-contact. Further, each brush (5a, 5a, 5b, 5b) is connected to a controlling device, etc., which are not illustrated in the drawings, through a connecting terminal (17).

Brushes (5a, 5a) of the same polarity are respectively positioned such that they will be separated by approximately 180° with respect to the rotation shaft in axis circumferential direction. In other words, a pair of positive electrode brushes (5a, 5a) are arranged to be substantially opposed to each other, and likewise a pair of negative electrode brushes (5b, 5b) are arranged to be substantially opposed to each other. Further, the brush having a different polarity, that is, one of the negative electrode brushes (5b) adjacent to a positive electrode brush (5a) is respectively positioned being separated by approximately 45° in axis circumferential direction.

Figure 4:
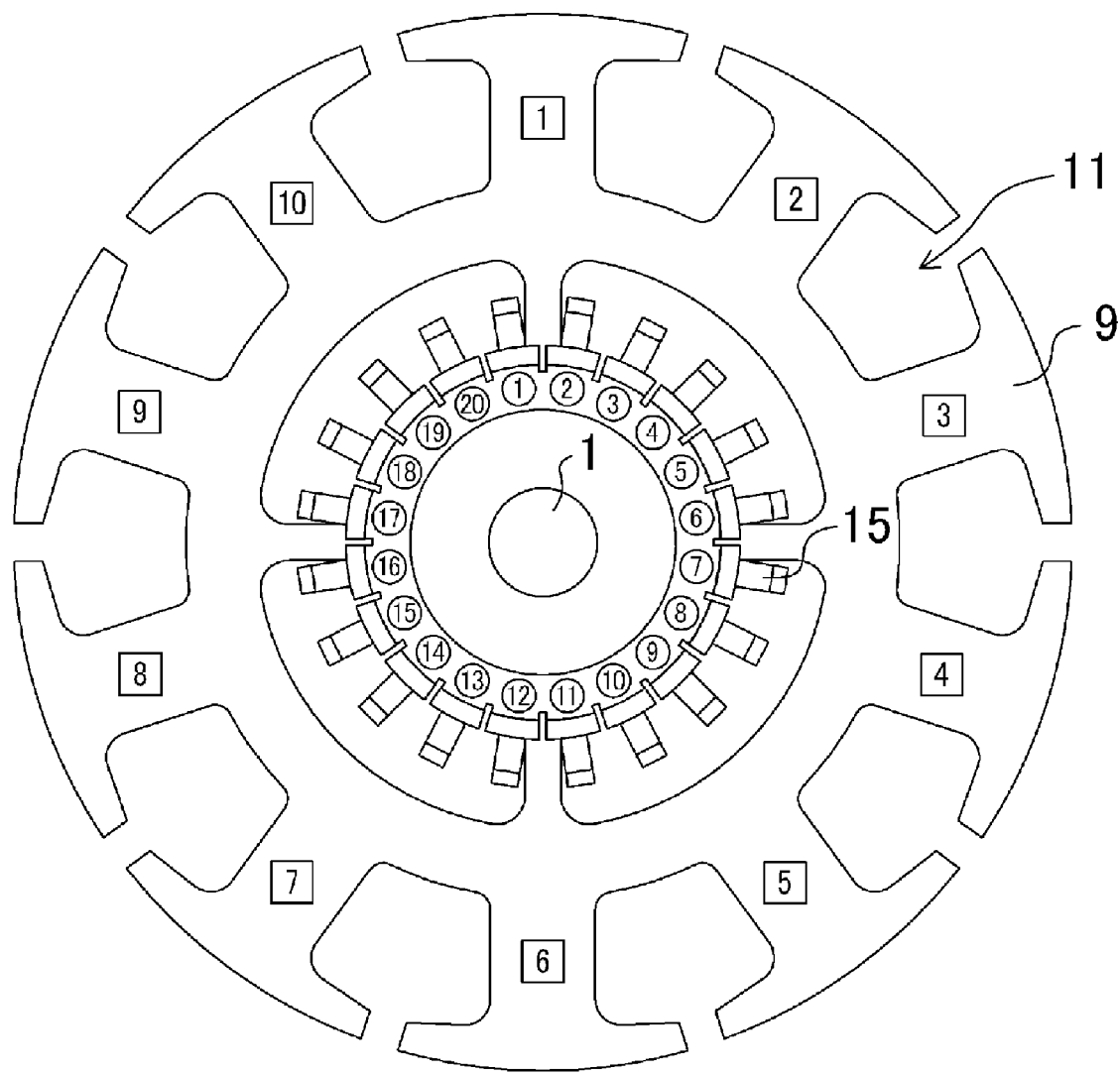
FIG. 4 is a schematic diagram illustrating the arrangements of the tooth sections and the segments according to a preferred embodiment of the present invention.

The present motor is preferably devised so that wire winding is possible with a single conductor wire (12). The wire winding structure is described in accordance with the arrangements of the tooth sections (9) and the commutator segments (15) illustrated in FIG. 4. Although either clockwise direction or counter clockwise direction is applicable, in the present preferred embodiment, each of the tooth sections (9) is identified with numbers 1~10 serially designated in clockwise direction starting from a certain tooth section (9) as shown in FIG. 4. Although it is not illustrated in the diagrams; a coil (10) is also identified with the same number as the tooth section (9) where each coil is formed. Further, each of the commutator segments (15) is identified by serially designating numbers 1~20 starting from a certain commutator segment (15) in the vicinity of the tooth section (9) identified as number 1 in the clockwise direction, in the same way as the tooth section (9).

Figure 5A:
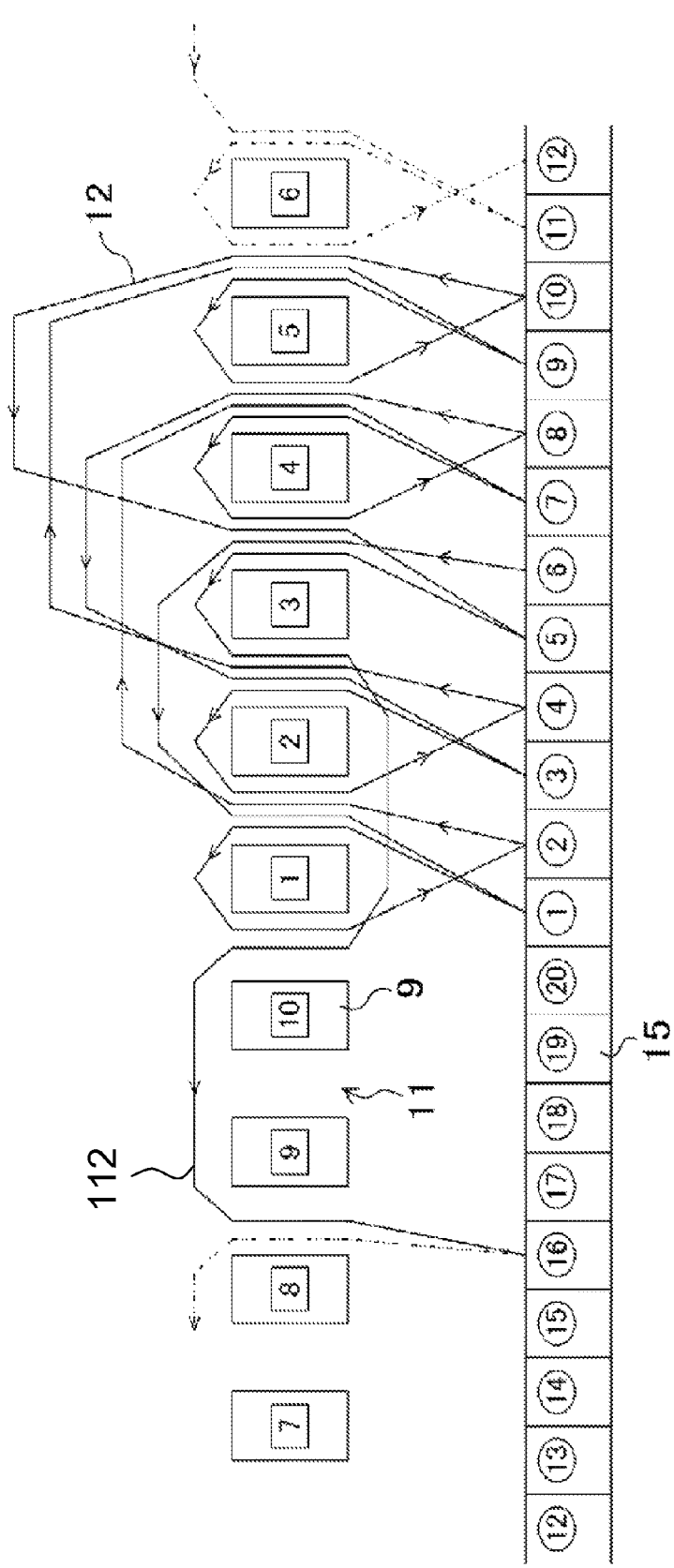
FIG. 5A and FIG. 5B are diagrams which illustrate the winding order of the conductor wire according to a preferred embodiment of the present invention.
Figure 5B:
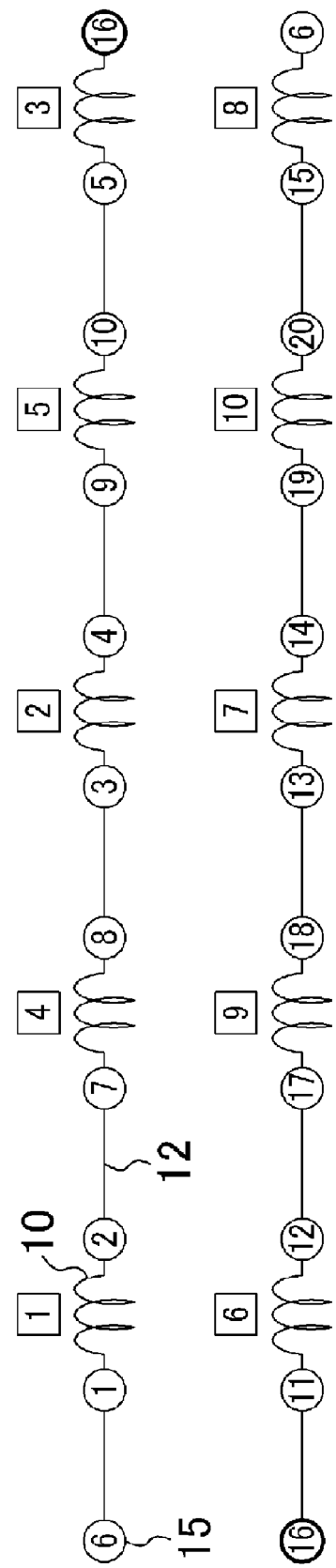

FIGS. 5A and 5B are schematic diagrams showing the order of winding the conductor wire (12) according to the present preferred embodiment. In the same diagram, FIG. 5A illustrates a figure of the tooth sections (9) and the commutator segments (15) in a plain figure, and the winding order of the conductor wire (12) in arrowed lines. FIG. 5B in the same diagram is a summarized diagram which illustrates the structure of the wound conductor wire (12).

As shown in these diagrams, firstly, the winding starting end of the conductor wire (12) is hook-held onto the sixth commutator segment (15). The winding starting end may be the first commutator segment (15) other than the sixth commutator segment (15). Subsequently, the conductor wire (12) is hooked onto the first commutator segment (15) and passed through the slot (11) between the first tooth section (9) and the second tooth section (9), and then wound a predetermined number of times around the first tooth section (9) to form a first coil (10). After that, the wire is hooked onto the second commutator segment (15) and then the seventh commutator segment (15). The second commutator segment (15) and the seventh commutator segment (15) are short-circuited. The same is with the sixth commutator segment (15) and the first commutator segment (15). The conductor wire (12) hooked onto the seventh commutator segment (15) is passed through the slot (11) between the fourth tooth section (9) and the fifth tooth section (9), and is wound around the fourth tooth section (9) a predetermined number of times to form a fourth coil (10).

After that, the conductor wire (12) is wound in accordance with the order illustrated in the diagram, and finally, it is held by hooking on the sixth or the first commutator segment (15) of the winding starting end. The wire winding process becomes easier because it only involves winding a single conductor wire (12). It is also possible to process the wire winding automatically with a wire winding device, which improves productivity. Also, in this case, each coil (10) formed on each of the tooth sections (9) 1~10, is arranged to be wound counter clockwise when viewed from a front end side of the tooth section (9). The conductor wire (12) which is hook-held on each commutator segment (15) is connected to each of the commutator segments (15) by removing the wire covering from the connected portion of the wire.

The wire winding structure formed as described above is a point-symmetrical figure in its first half and the latter half of the structure. When each tooth section (9) and each commutator segment (15) are divided into a winding starting side and winding ending side viewed from the axial direction, in other words, when divided into a first group including the first through fifth tooth sections (9) and the first through tenth commutator segments (15), and a second group including the sixth through tenth tooth sections (9) and the eleventh through twentieth commutator segments (15), the wire winding section of each tooth section (9) and each commutator segment (15) from each group is arranged in a point-symmetrical figure with respect to the rotation shaft.

Further, the portion (equalizer (112)) where the conductor wire (12) extends between each commutator segment (15) or between each tooth section (9) is eccentrically located at the side of the tooth section. For example, when the conductor wire (12) is wound on another commutator segment (15) distant from a certain commutator segment (15), the conductor wire (12) is wound and hooked by passing the vicinity of the tooth section (9). Such an arrangement prevents the equalizer (112) from inadvertently being hooked onto the shaft (1), etc. during the manufacturing process or rotating of the motor. For instance, it prevents possible fracture or shortage that is occurred when the knurling processed portion of the shaft (1) is in contact with the conductor wire (12).

Figure 6:
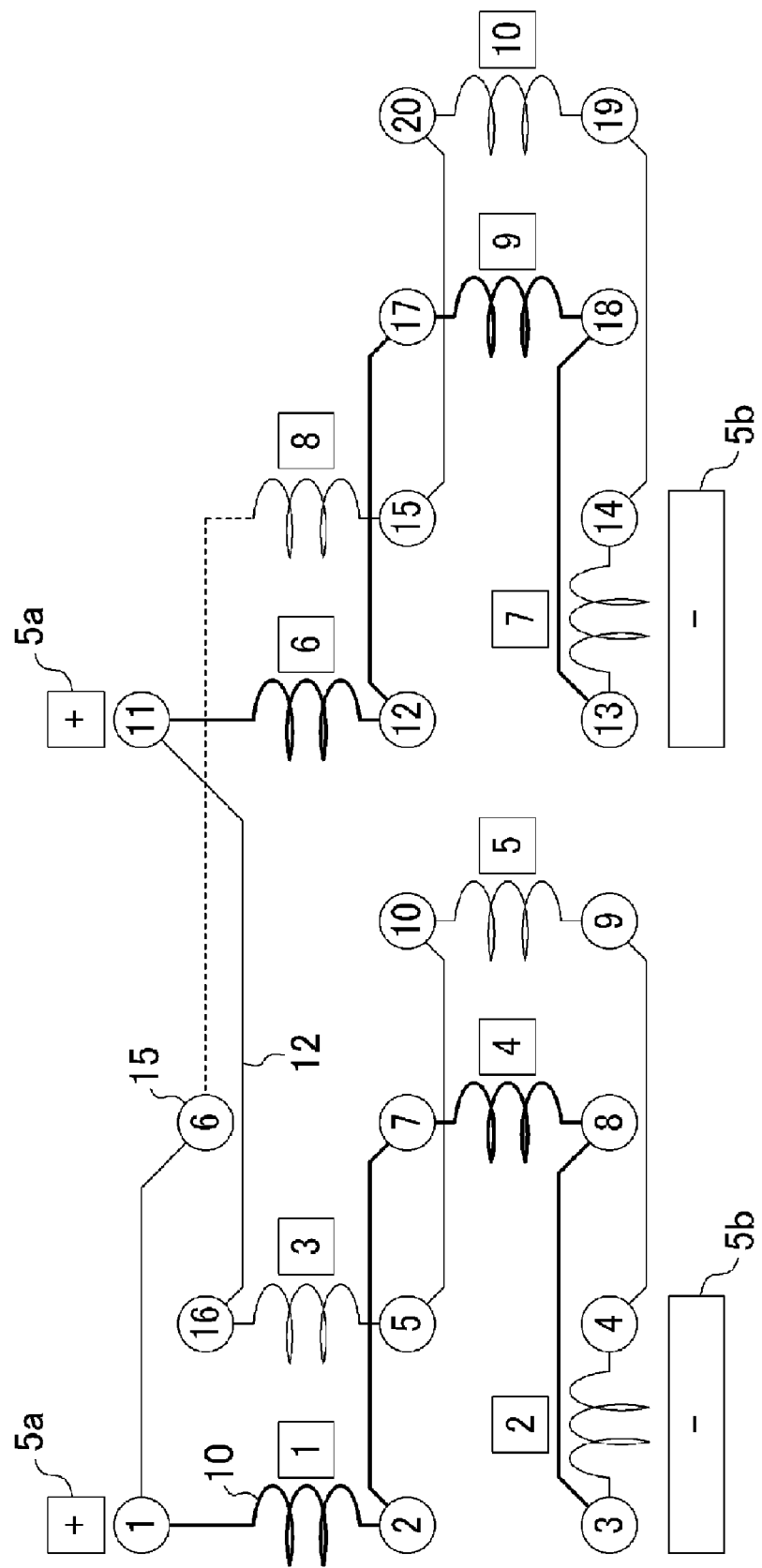
FIG. 6 is a schematic diagram illustrating the circuit configuration according to a preferred embodiment of the present invention.

FIG. 6 is a circuit diagram of the above-explained wire winding structure. By arranging the brush-set (5) as explained above, for example, when the first and eleventh commutator segments (15) are respectively connected to the positive electrode brushes (5a, 5a), the third and fourth commutator segments (15) are connected to one negative electrode brush (5b), and the thirteenth and the fourteenth commutator segments (15) are connected to the other negative electrode brush (5b). With such configuration, the first and fourth coils (10) are connected in series between the first commutator segment (15) (positive electrode) and the third commutator segment (15) (negative electrode), and the eighth and tenth coils (10) are connected in series between the first commutator segment (15) (positive electrode) and the fourteenth commutator segment (15) (negative electrode). Also, the sixth and ninth coils (10) are connected in series between the eleventh commutator segment (15) (positive electrode) and the thirteenth commutator segment (15) (negative electrode), and the third and fifth coils (10) are connected in series between the eleventh commutator segment (15) (positive electrode) and the fourth commutator segment (15) (negative electrode).

By arranging such circuit, it becomes possible to switch the output of the motor through switching the state in which the brush-set (5) is electrically connected.

Figure 7A:
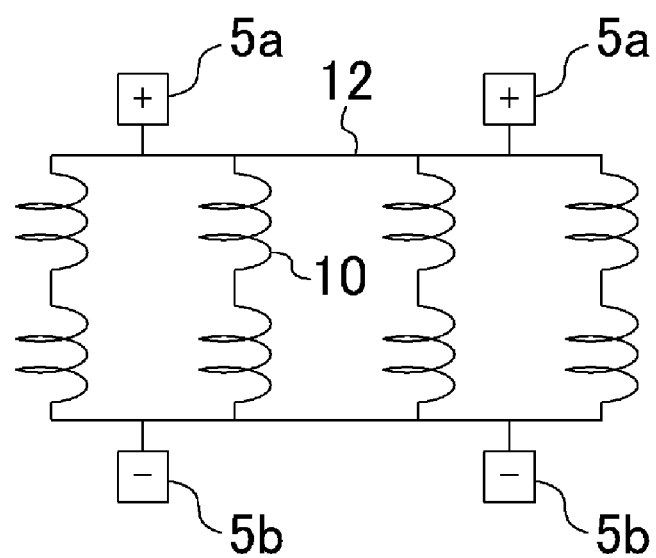
FIGS. 7A-7C are diagrams illustrating different states of switching in which the brush-set is energized according to a preferred embodiment of the present invention.
Figure 7B:
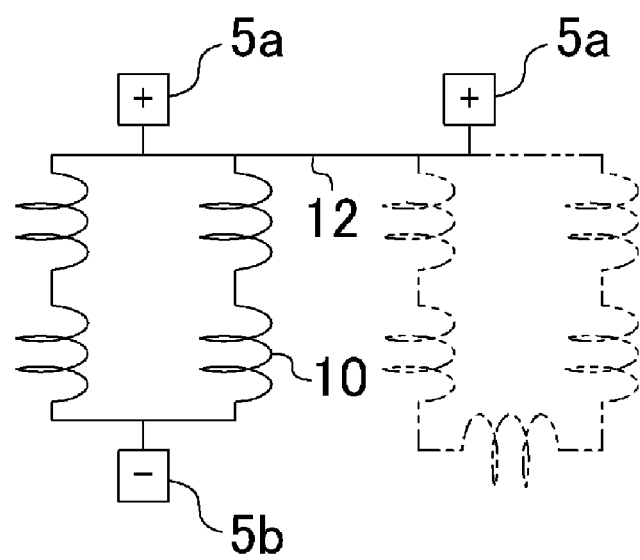
Figure 7C:
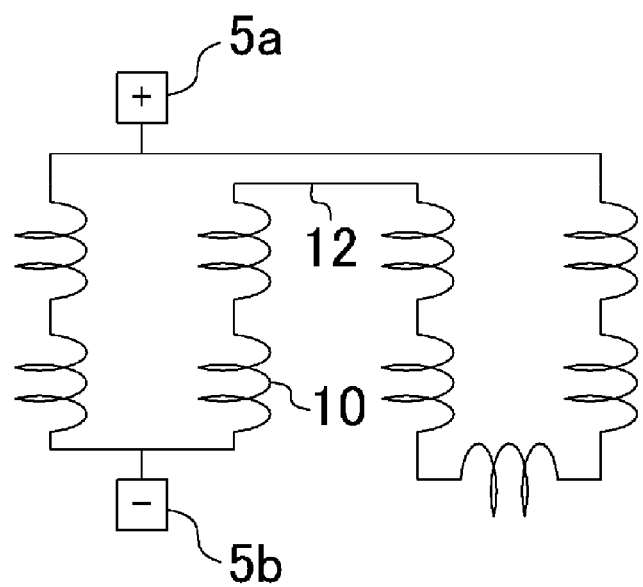

FIGS. 7A-7C illustrate an example of such switching pattern. FIG. 7A shows when all 4 brushes (5a, 5a, 5a, 5a) are electrically connected (use of all 4 brushes). In this case, the total resistance value formed between the positive and negative electrodes becomes R/2, with R being the resistance value per one coil. FIG. 7B shows when one negative electrode brush (5b) (use of three brushes) stops being electrically connected. In this case, since 4 coils (10) form a closed-loop, the total resistance value formed between the positive and negative electrodes becomes R. FIG. 7C shows when 2 brushes of different polarity located away from each other (5a, 5b) (use of 2 brushes) stop being electrically connected. In this case, a circuit is formed where 2 coils (10) in series are connected in parallel with seven coils (10) in series and therefore the total resistance value formed between the positive and negative electrodes become 14R/9.

Figure 8:
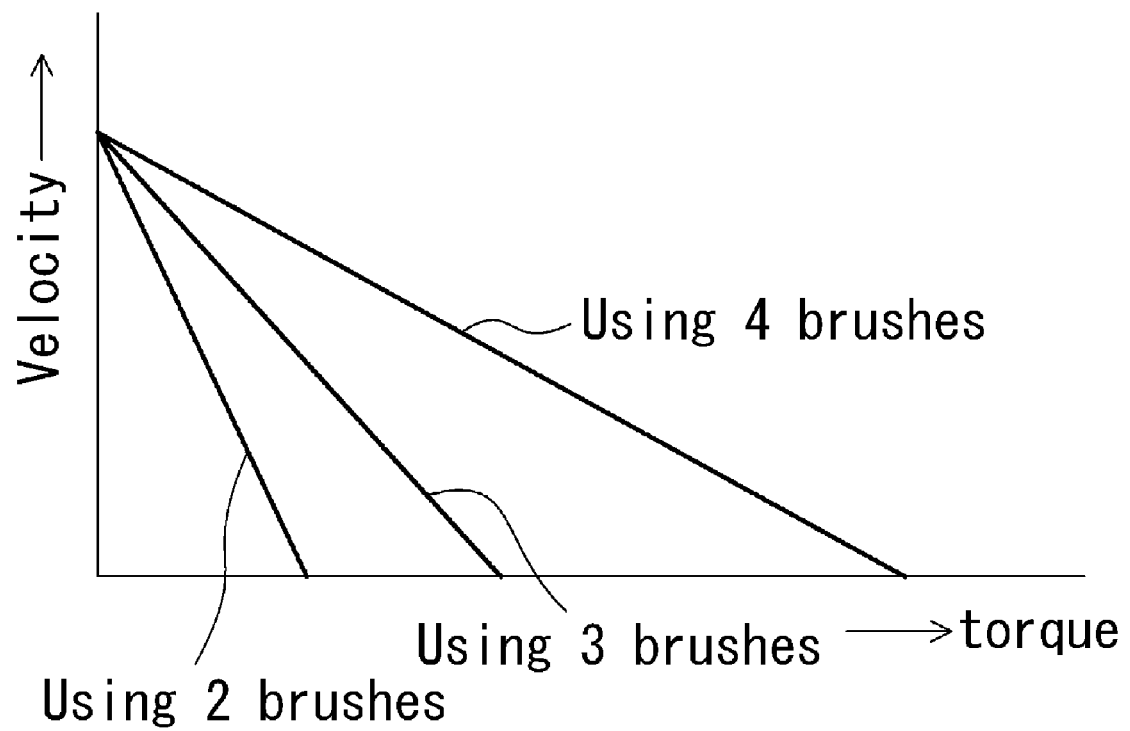
FIG. 8 is a schematic diagram illustrating the difference in the motor's output in different states of the brush-sets according to a preferred embodiment of the present invention.

Accordingly, by switching the state in which the brush-set (5) is electrically connected, the total resistance value can be changed under a constant counter electromotive force and therefore the output (torque or velocity) of the motor can be switched, as illustrated in FIG. 8.

Figure 9:
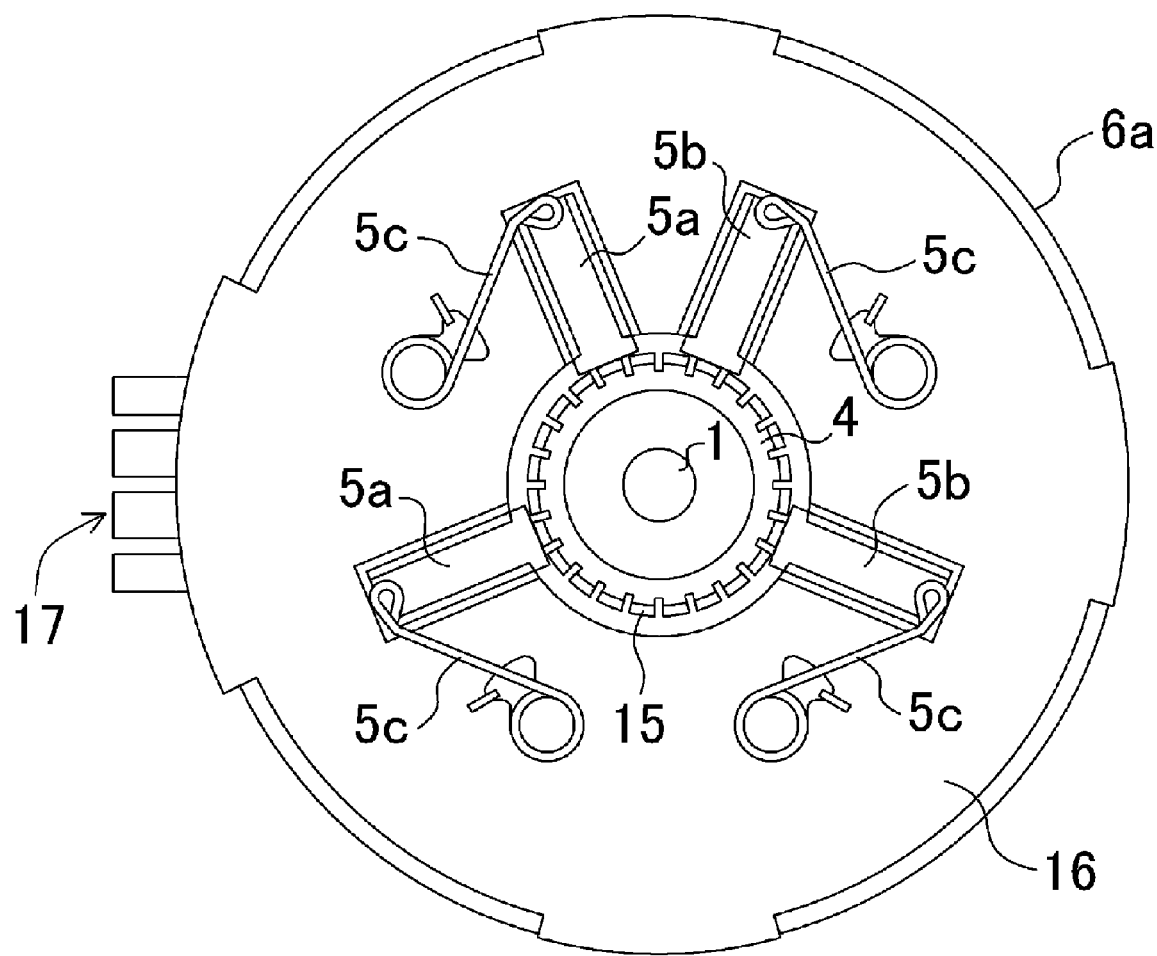
FIG. 9 is a diagram illustrating an alternative example of the first preferred embodiment, corresponding to FIG. 3.
Figure 10A:
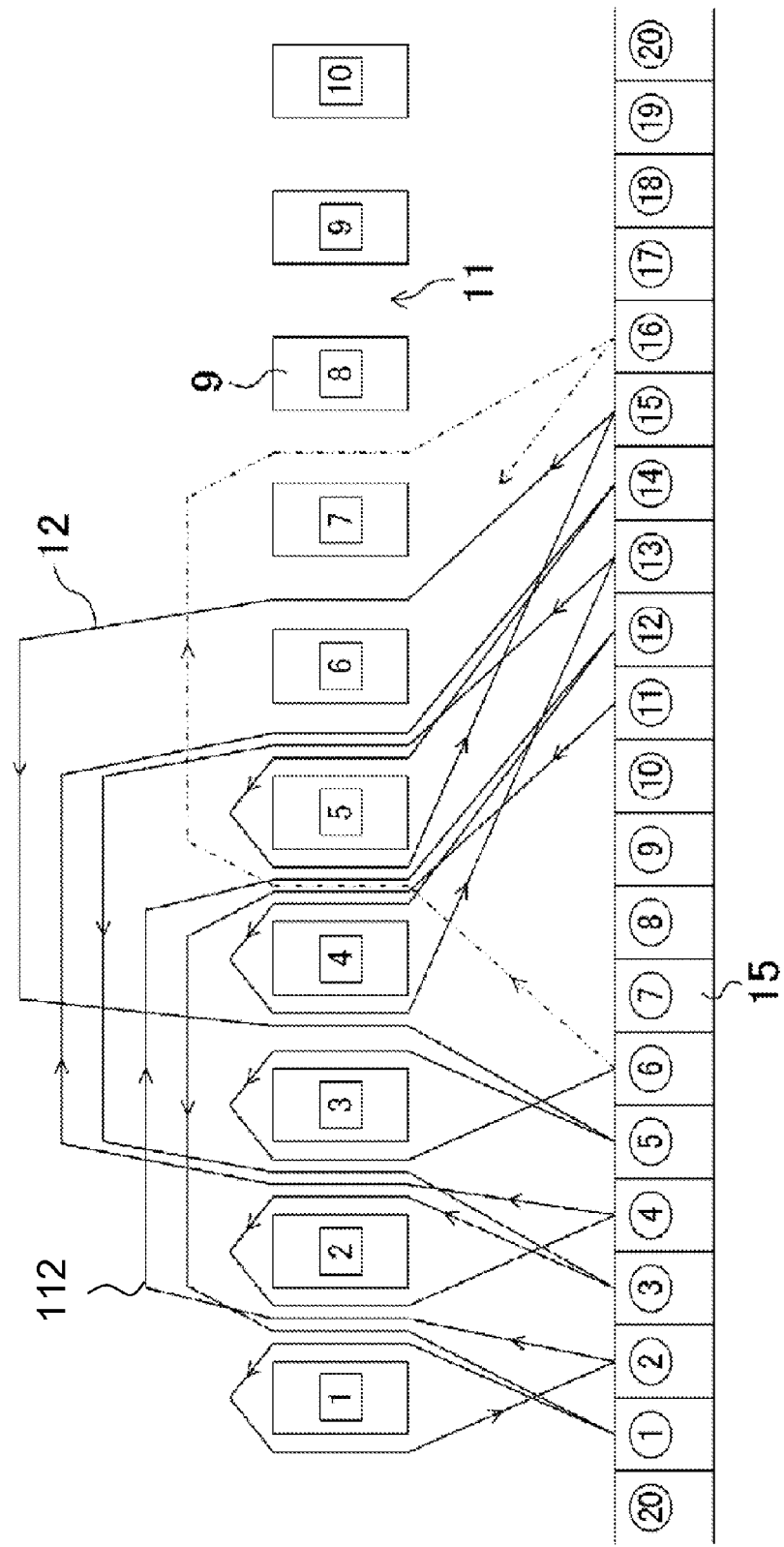
FIG. 10A and FIG. 10B are diagrams illustrating the winding order of a conductor wire in an alternative example of the first preferred embodiment of the present invention.
Figure 10B:
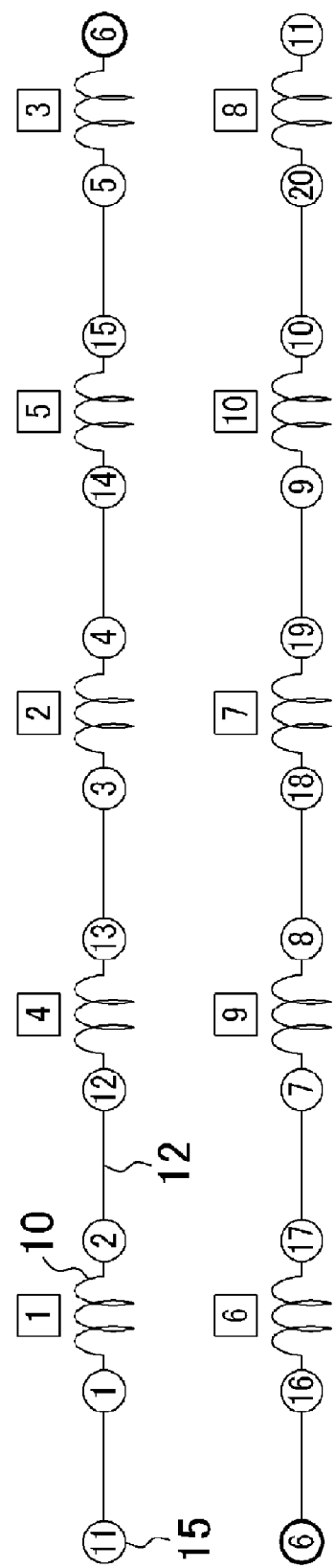
Figure 11:
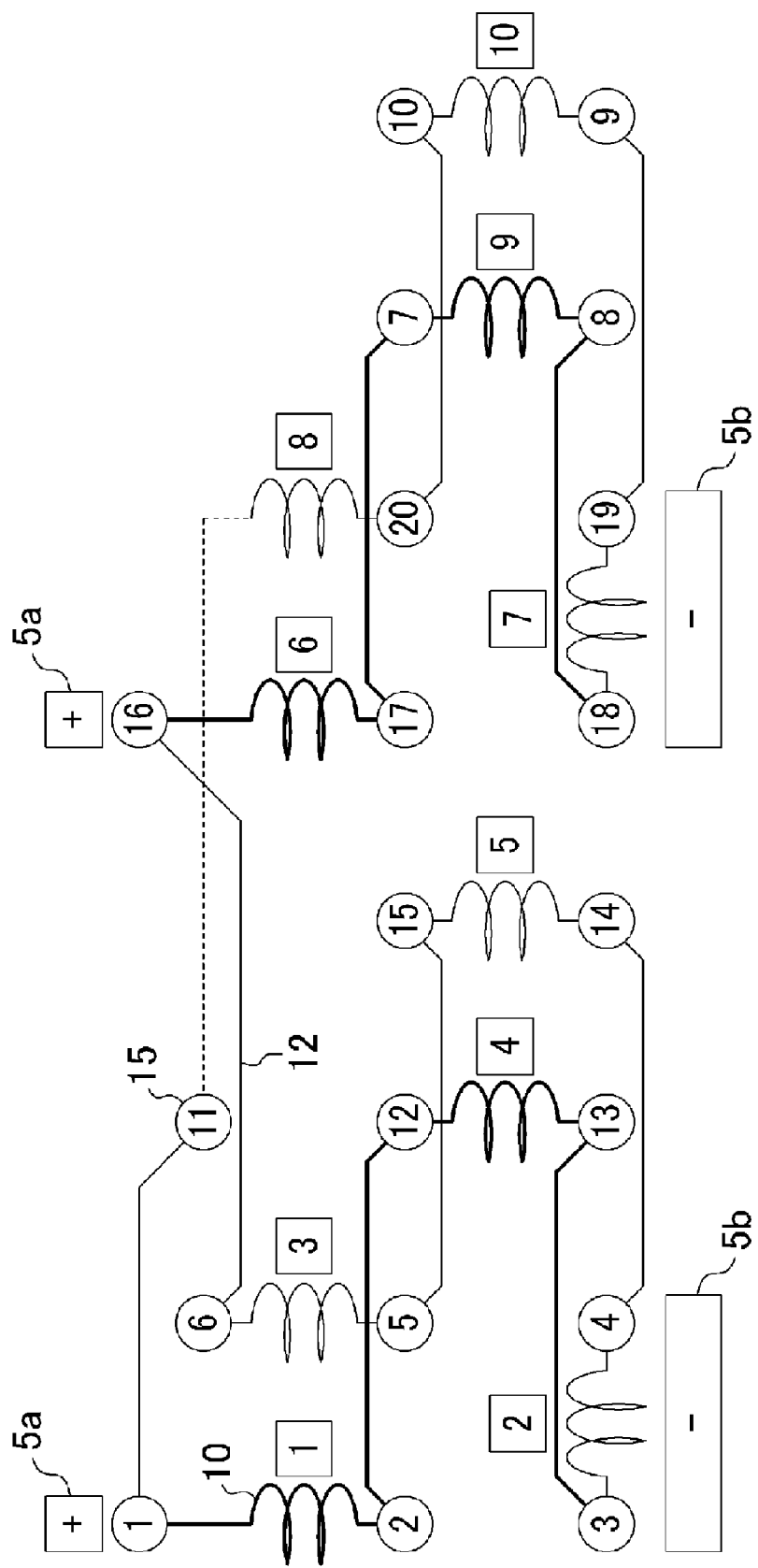
FIG. 11 is a schematic diagram illustrating the circuit configuration in an alternative example of the first preferred embodiment of the present invention.

FIGS. 9-11 illustrate an alternative example of the first preferred embodiment. In this preferred embodiment, the brush-set (5) arrangement and the wire winding structure are set in a different form. Since other elements are similar to those already described above, only the differences between this preferred embodiment and the other preferred embodiments will be explained, and identical elements will be referred to with identical reference characters without detailed explanation.

As illustrated in FIG. 9, the brush-set (5) of the present preferred embodiment shows that the brushes of the same polarity (5a, 5a) are positioned being separated by approximately 90° in a circumferential axis direction. The same arrangement is made for the other brushes of the same polarity (5b, 5b). One of the positive electrode brushes (5a) and negative brushes (5b) are each positioned being separated by approximately 45° in the circumferential axis direction.

FIGS. 10A and 10B illustrate the winding order of the conductor wire (12) in the present preferred embodiment, and FIG. 11 is a circuit diagram thereof. Such arrangement of brush-set (5) and wire winding structure also enables to configure the previously-explained circuit and to switch the output of the motor as well.

Second Preferred Embodiment

Figure 12:
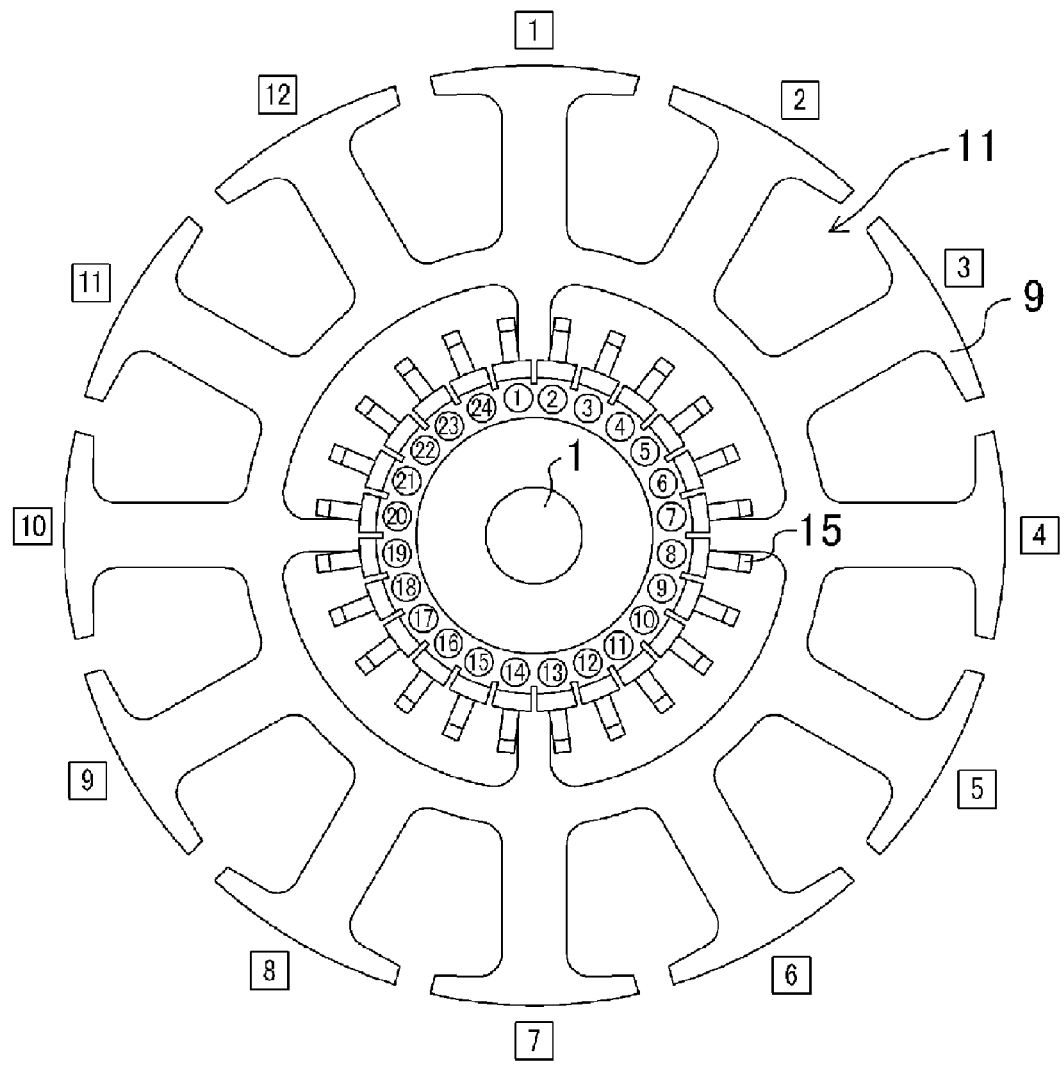
FIG. 12 is a schematic diagram illustrating the arrangements of the tooth sections and the segments in the second preferred embodiment of the present invention.
Figure 13B:
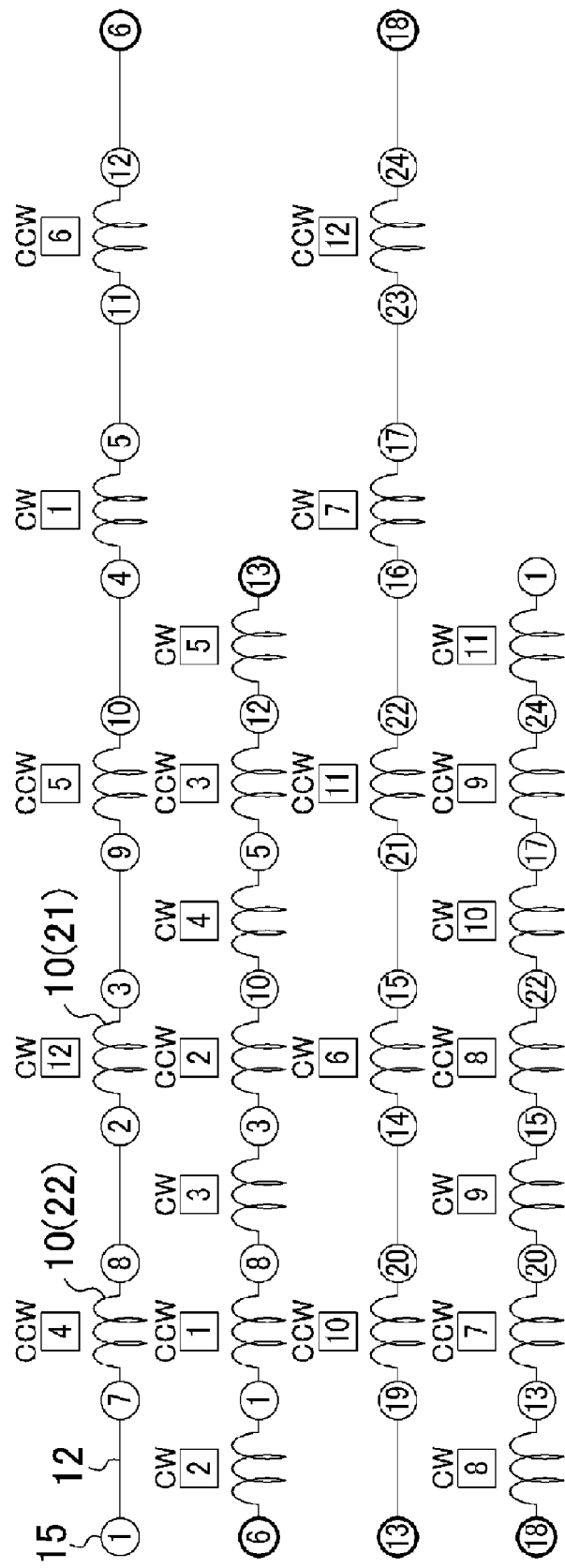

FIG. 12 and FIG. 13 schematically illustrate the second preferred embodiment. Since the basic arrangement of the motor is the same as described in the first preferred embodiment, only the differences will be discussed, and identical elements will be referred as identical reference characters without detailed explanation.

As illustrated in FIG. 12, the motor according to the present preferred embodiment includes 12 tooth sections (9) (12-slot), and 24 commutator segments (15) (24-segment). In this case, the wire winding structure is formed preferably by using a single conductor wire (12). In order to enable the switching of the motor output by switching the state in which the brush-set (5) is electrically connected, a wire winding structure may be formed by winding a single conductor wire (12) as illustrated in FIG. 13.

Specifically, when the first commutator segment (15) is set as the winding starting end, the conductor wire (12) is hooked onto the seventh commutator segment (15) and passed through the slot (11) between the fourth tooth section (9) and the fifth tooth section (9), and then wound a predetermined number of times around the fourth tooth section (9) to form a coil (10). This coil (10) is arranged to be wound in a counter clockwise direction when viewed from a front end side of the tooth section (9) [the second coil (22), indicated with a bold line in FIG. 13A]. Then, the wire is hooked onto the eighth commutator segment (15) and subsequently onto the second commutator segment (15). The eighth commutator segment (15) and the second commutator segment (15) are short-circuited. The conductor wire (12) hooked onto the second commutator segment (15) is passed through the slot (11) between the eleventh tooth section (9) and the twelfth tooth section (9), and is wound a predetermined number of times around the twelfth tooth section (9) to form a coil (10). This coil (10) is arranged with a clockwise direction when viewed from a front end side of the tooth section (9) [the first coil (21), indicated with a fine line in FIG. 13A]. And then, according to the order illustrated in the same diagram, the conductor wire (12) is hook-held on each commutator segment (15), and wound around each tooth section (9) to form the coil (10).

With such a process, the first coil (21) and the second coil (22) can be formed on each tooth section (9). For example, in the fifth tooth section (9), the conductor wire (12) drawn from the ninth commutator segment (15) is wound through the slot (11) between the fifth tooth section (9) and the sixth tooth section (9) to form the second coil (22). After that, the conductor wire (12) drawn from the twelfth commutator segment (15) is wound through the slot (11) between the fourth tooth section (9) and the fifth tooth section (9) to form the first coil (21). Likewise, the first coil (21) and the second coil (22) are formed in an overlapping manner on each of the first through twelfth tooth sections (9).

With 8-pole, 12-slot, 24-segment motor, an output-switchable motor which involves winding a single conductor wire (12) can be realized by forming such a wire winding structure.

Third Preferred Embodiment

Figure 14:
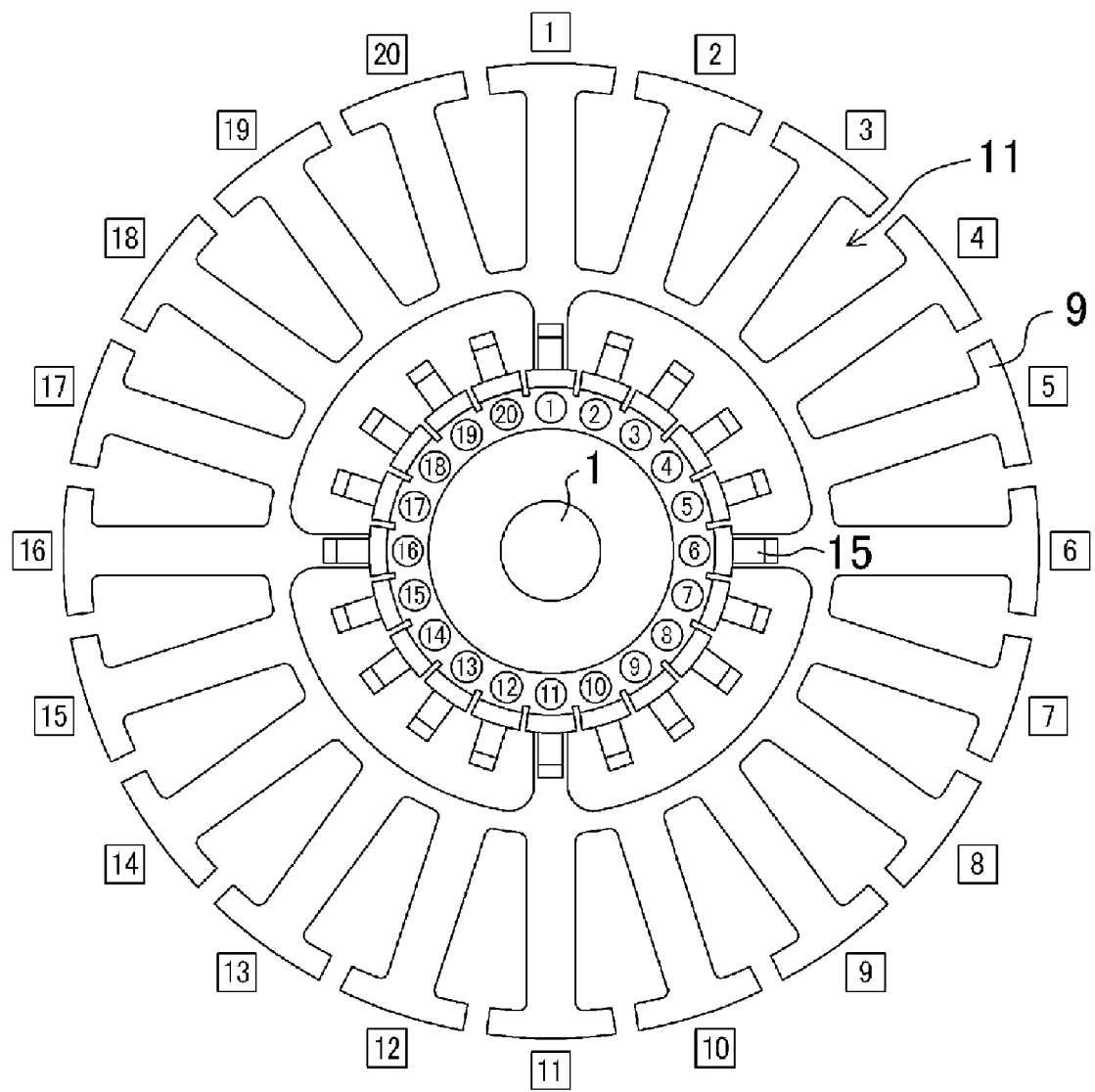
FIG. 14 is a schematic diagram illustrating the arrangements of the tooth sections and the segments according to the third preferred embodiment of the present invention.
Figure 15:
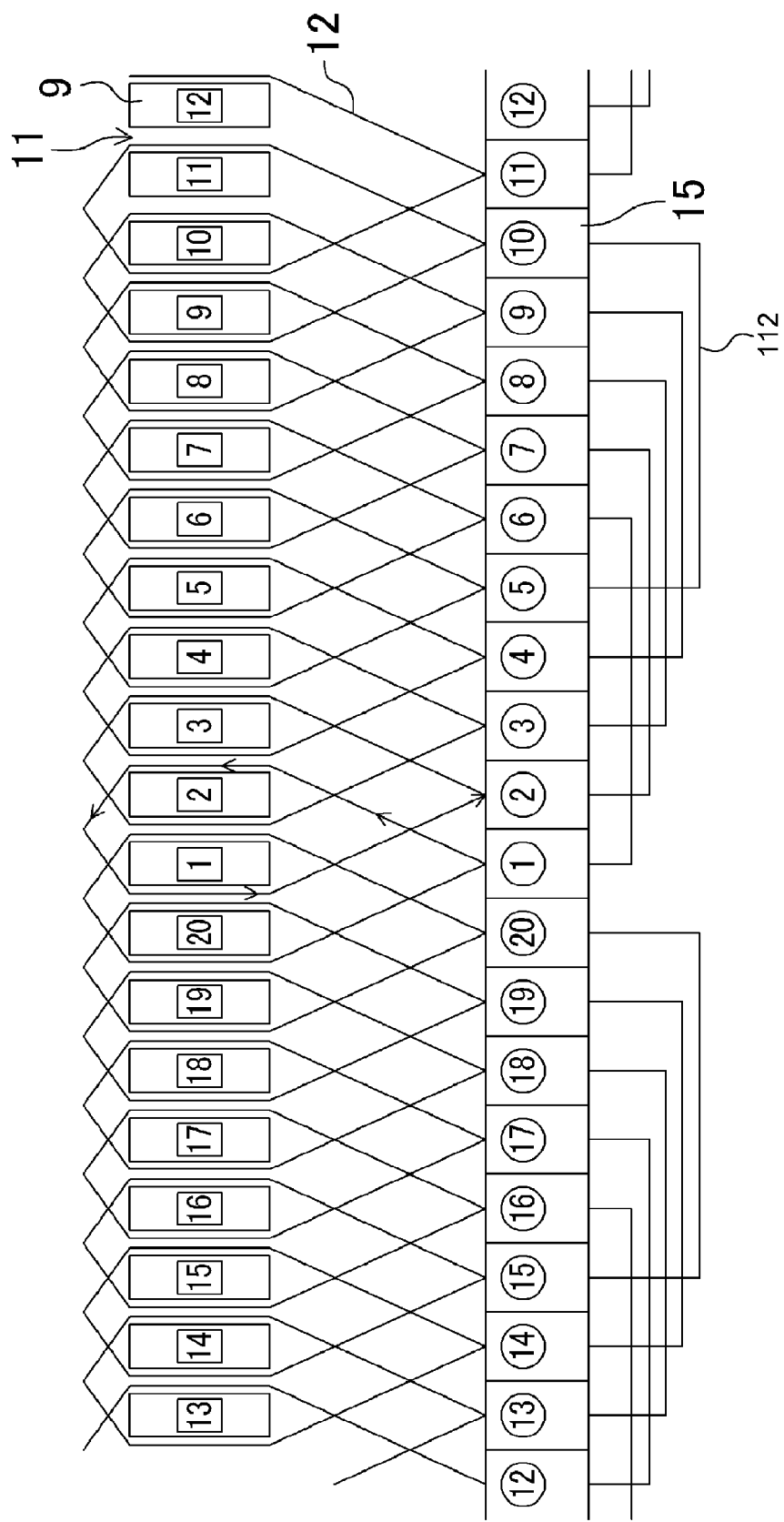
FIG. 15 is a diagram illustrating the winding order of a conductor wire according to the third preferred embodiment of the present invention.

FIG. 14 and FIG. 15 schematically illustrate the third preferred embodiment of the present invention. Since the basic configuration of the motor is identical to that of the above preferred embodiments, only the differences will be discussed, and identical elements will be referred to with identical reference characters any without detailed explanation.

As illustrated in FIG. 14, the motor according to the present preferred embodiment includes 20 tooth sections (9) (20-slot) and 20 commutator segments (15) (20-segment). In such case, a wire winding structure using a single conductor wire (12) can be formed by winding the conductor wire (12) by distributed winding as illustrated in FIG. 15, for example. With such 8-pole, 20-slot, 20-segment motor, an output-switchable motor can be realized by using such wire winding structure.

Fourth Preferred Embodiment

Figure 16:
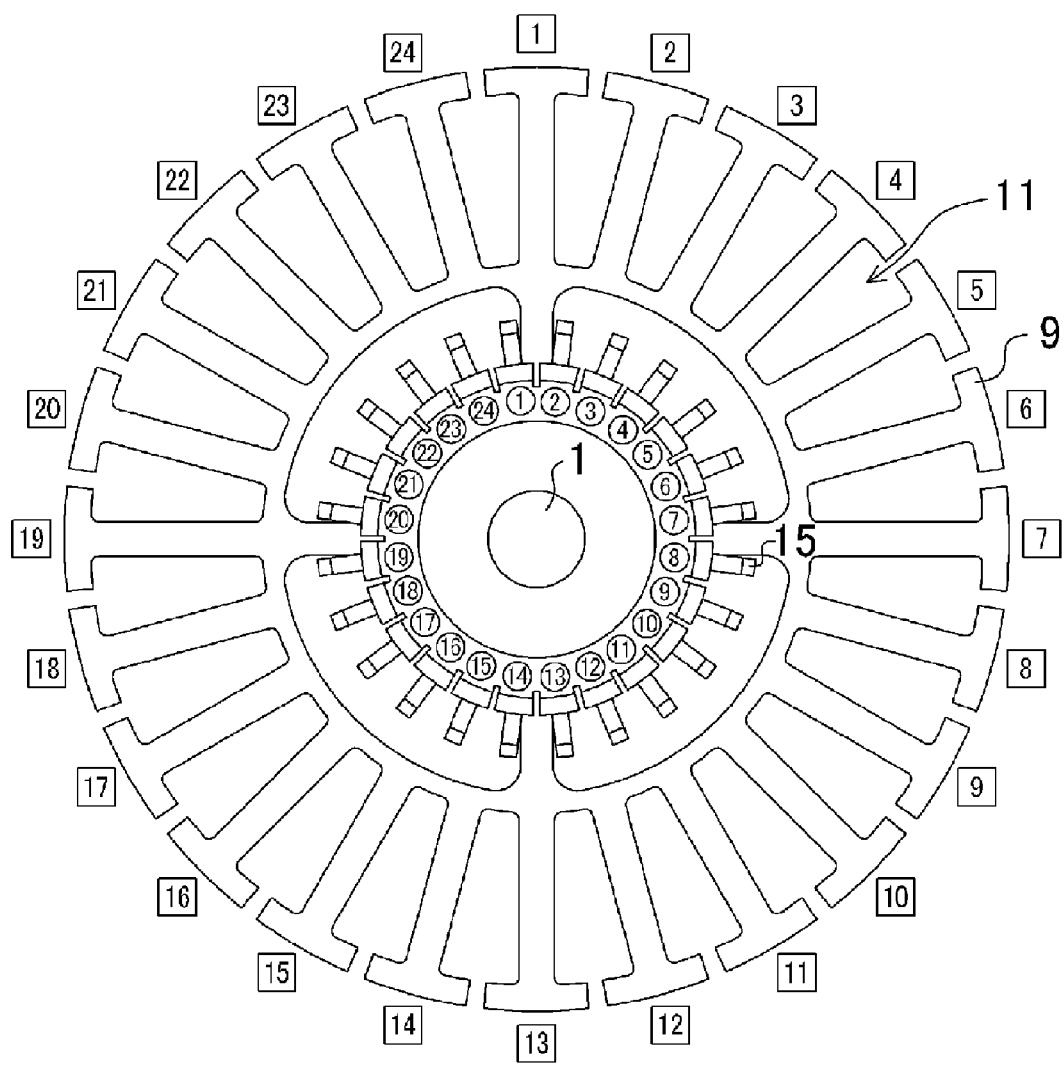
FIG. 16 is a schematic diagram illustrating the arrangements of the tooth sections and the segments in the fourth preferred embodiment of the present invention.
Figure 17:
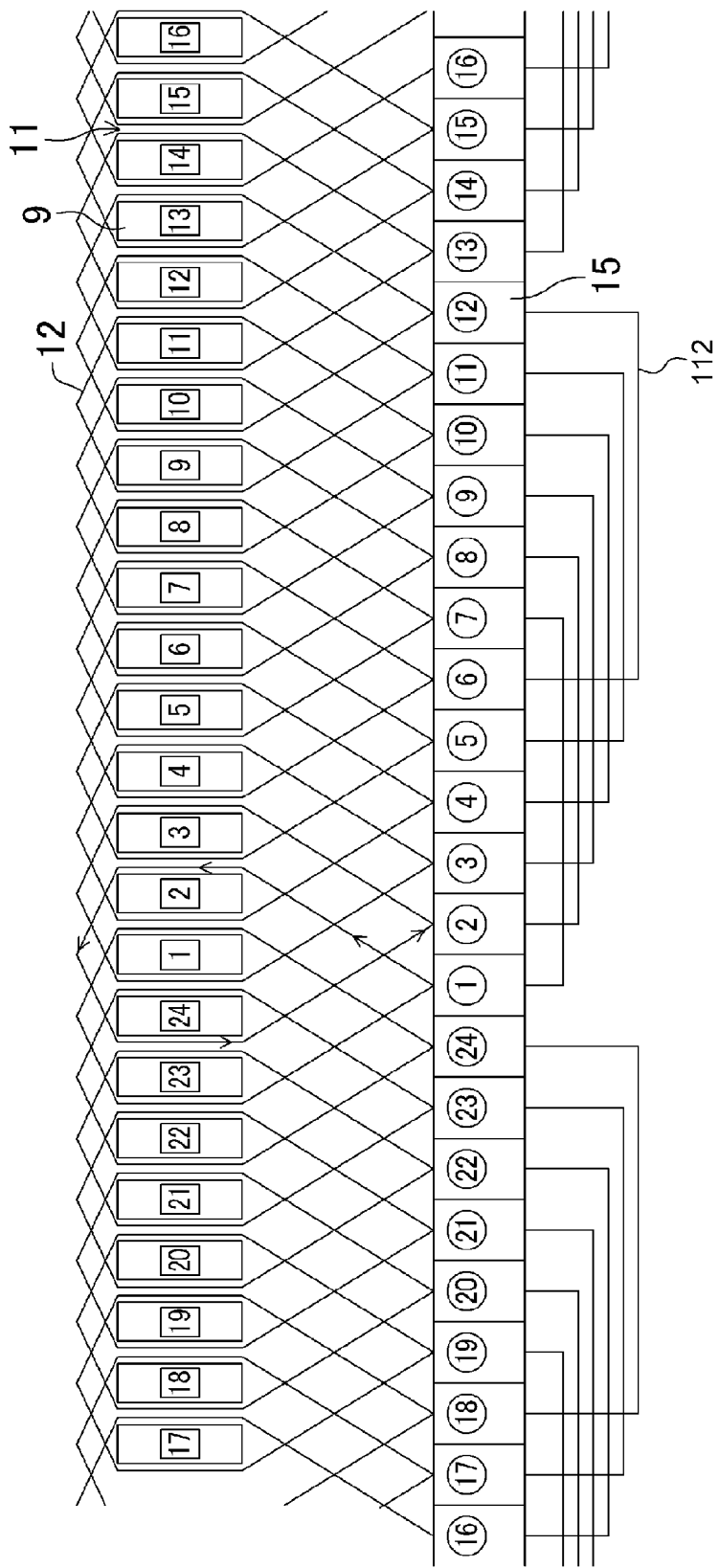
FIG. 17 is a diagram illustrating the winding order of a conductor wire in the fourth preferred embodiment of the present invention.

FIG. 16 and FIG. 17 schematically illustrate the fourth preferred embodiment of the present invention. Since the basic configuration of the motor is identical to that of the first preferred embodiment, only the differences will be discussed, and identical elements will be referred to with identical reference characters without any detailed explanation.

As illustrated in FIG. 16, the motor of the present preferred embodiment includes 24 tooth sections (9) (24-slot) and 24 commutator segments (15) (24-segment). In such case, a wire winding structure using a single conductor wire (12) can be formed by winding the conductor wire (12) by distributed winding as illustrated in FIG. 17, for example. With such 8-pole, 24-slot, 24-segment motor, an output-switchable motor can be realized by using such wire winding structure.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A motor comprising:
8 magnetic poles;
an armature including 10 tooth sections;
a commutator including 20 commutator segments; and
a brush-set including 2 positive electrode brushes and 2 negative electrode brushes; wherein
a hook-holding section arranged to hook-hold conductor wires is installed on each of the commutator segments;
a group of coils is provided by a single conductor wire that has been wound onto each of the plurality of tooth sections and has been hooked onto the plurality of hook holding sections;
the group of coils is defined by a concentrated winding of the single conductor wire;
when each of the 10 tooth sections are respectively serially designated as first through tenth tooth sections in either a clockwise or counterclockwise direction starting from a certain predetermined tooth section, the winding starts at the first tooth section, and the single conductor wire is wound onto the fourth tooth section, the second tooth section, the fifth tooth section, the third tooth section, the sixth tooth section, the ninth tooth section, the seventh tooth section, and the tenth tooth section in this order, and the winding ends at the tenth tooth section; and
a state in which the brushes of the brush-set are energized during operation of the motor is capable of being switched between at least two different modes.

2. The motor according to claim 1, wherein
the brushes of the same polarity in the brush-set are respectively separated from each other by approximately 180° in a circumferential direction about an axis of the motor; and when the 20 commutator segments are respectively serially designated as first through twentieth commutator segments starting from a certain commutator segment adjacent to the certain tooth section in the same one of the clockwise or counterclockwise direction as the tooth sections, the winding starts at the first or the sixth commutator segment, and the conductor wire is wound onto the first tooth section, the second commutator segment, the seventh commutator segment, the fourth tooth section, the eighth commutator segment, the third commutator segment, the second tooth section, the fourth commutator segment, the ninth commutator segment, the fifth tooth section, the tenth commutator segment, the fifth commutator segment, the third tooth section, the sixteenth commutator segment, the eleventh commutator segment, the sixth tooth section, the twelfth commutator segment, the seventeenth commutator segment, the ninth tooth section, the eighteenth commutator segment, the thirteenth commutator segment, the seventh tooth section, the fourteenth commutator segment, the nineteenth commutator segment, the tenth tooth section, the twentieth commutator segment, the fifteenth commutator segment, and the eighth tooth section in this order, and the winding ends at the first or the sixth commutator segment where the winding started.

3. The motor according to claim 1, wherein
the brushes of the same polarity in the brush-set are respectively separated from each other by approximately 90° in a circumferential direction about an axis of the motor; and when the 20 commutator segments are respectively serially designated as first through twentieth commutator segments starting from a certain commutator segment adjacent to the certain tooth section in the same one of the clockwise or counterclockwise direction as the tooth sections, the winding starts at the first or the eleventh commutator segment, and the conductor wire is wound onto the first tooth section, the second commutator segment, the twelfth commutator segment, the fourth tooth section, thirteenth commutator segment, the third commutator segment, the second tooth section, the fourth commutator segment, the fourteenth commutator segment, the fifth tooth section, the fifteenth commutator segment, the fifth commutator segment, the third tooth section, the sixth commutator segment, the sixteenth commutator segment, the sixth tooth section, the seventeenth commutator segment, the seventh commutator segment, the ninth tooth section, the eighth commutator segment, the eighteenth commutator segment, the seventh tooth section, the nineteenth commutator segment, the ninth commutator segment, the tenth tooth section, the tenth commutator segment, the twentieth commutator segment and the eighth tooth section in this order, and the winding ends at the first or the eleventh commutator segment where the winding started.

4. The motor according to claim 1, wherein a portion of the single conductor wire defines an equalizer which extends over intervals of the plurality of hook-holding sections or the plurality of tooth sections, and which is eccentrically located at a side of the tooth section.

5. A motor comprising:
8 magnetic poles;
an armature including 12 tooth sections;
a commutator including 24 commutator segments; and
a brush-set including 2 positive electrode brushes and 2 negative electrode brushes; wherein
a hook-holding section arranged to hook-hold conductor wires is installed on each of the commutator segments;
a group of coils is provided by a single conductor wire that has been wound onto each of the plurality of tooth sections and has been hooked onto the plurality of hook-holding sections;
the group of coils is provided by a concentrated winding of the single conductor wire; and
when each of the 12 tooth sections are respectively serially designated as first through twelfth tooth sections in either a clockwise or counterclockwise direction starting from a certain predetermined tooth section, the winding starts at the fourth tooth section, and the single conductor wire is wound onto the twelfth tooth section, the fifth tooth section, the first tooth section, the sixth tooth section, the second tooth section, the first tooth section, the third tooth section, the second tooth section, the fourth tooth section, the third tooth section, the fifth tooth section, the tenth tooth section, the sixth tooth section, the eleventh tooth section, the seventh tooth section, the twelfth tooth section, the eighth tooth section, the seventh tooth section, the ninth tooth section, the eighth tooth section, the tenth tooth section, the ninth tooth section, in this order, and the winding ends at the eleventh tooth section; and
a state in which the brushes of the brush-set are energized during operation of the motor is capable of being switched between at least two different modes.

6. The motor according to claim 5, wherein
when the 24 commutator segments are respectively serially designated as first through twenty-fourth commutator segments starting from a certain commutator segment adjacent to the certain tooth section in the same one of the clockwise or counterclockwise direction as the tooth sections, and the conductor wire is wound onto the seventh commutator segment, the fourth tooth section, the eighth commutator segment, the second commutator segment, the twelfth tooth section, third commutator segment, the ninth commutator segment, the fifth tooth section, the tenth commutator segment, the fourth commutator segment, the first tooth section, the fifth commutator segment, the eleventh commutator segment, the sixth tooth section, the twelfth commutator segment, the sixth commutator segment, the second tooth section, the first commutator segment, the first tooth section, the eighth commutator segment, the third tooth section, the third commutator segment, the second tooth section, the tenth commutator segment, the fourth tooth section, the fifth commutator segment, the third tooth section, the twelfth commutator segment, the fifth tooth section, the thirteenth commutator segment, the nineteenth commutator segment, the tenth tooth section, the twentieth commutator segment, the fourteenth commutator segment, the sixth tooth section, the fifteenth commutator segment, the twenty-first commutator segment, the eleventh tooth section, the twenty-second commutator segment, the sixteenth commutator segment, the seventh tooth section, the seventeenth commutator segment, the twenty-third commutator segment, the twelfth tooth section, the twenty-fourth commutator segment, the eighteenth commutator segment, the eighth tooth section, the thirteenth commutator segment, the seventh tooth section, the twentieth commutator segment, the ninth tooth section, the fifteenth commutator segment, the eighth tooth section, the twenty-second commutator segment, the tenth tooth section, the seventeenth commutator segment, the ninth tooth section, the twenty-fourth commutator segment, and the eleventh tooth section in this order, and the winding ends at the first commutator segment where the winding started.

7. The motor according to claim 5, wherein a portion of the single conductor wire defines an equalizer which extends over intervals of the plurality of hook-holding sections or the plurality of tooth sections, and which is eccentrically located at a side of the tooth section.

* * * * *